July 10, 1945.  A. F. BANDUR  2,379,947
TESTING DEVICE
Filed Sept. 9, 1942    2 Sheets-Sheet 1
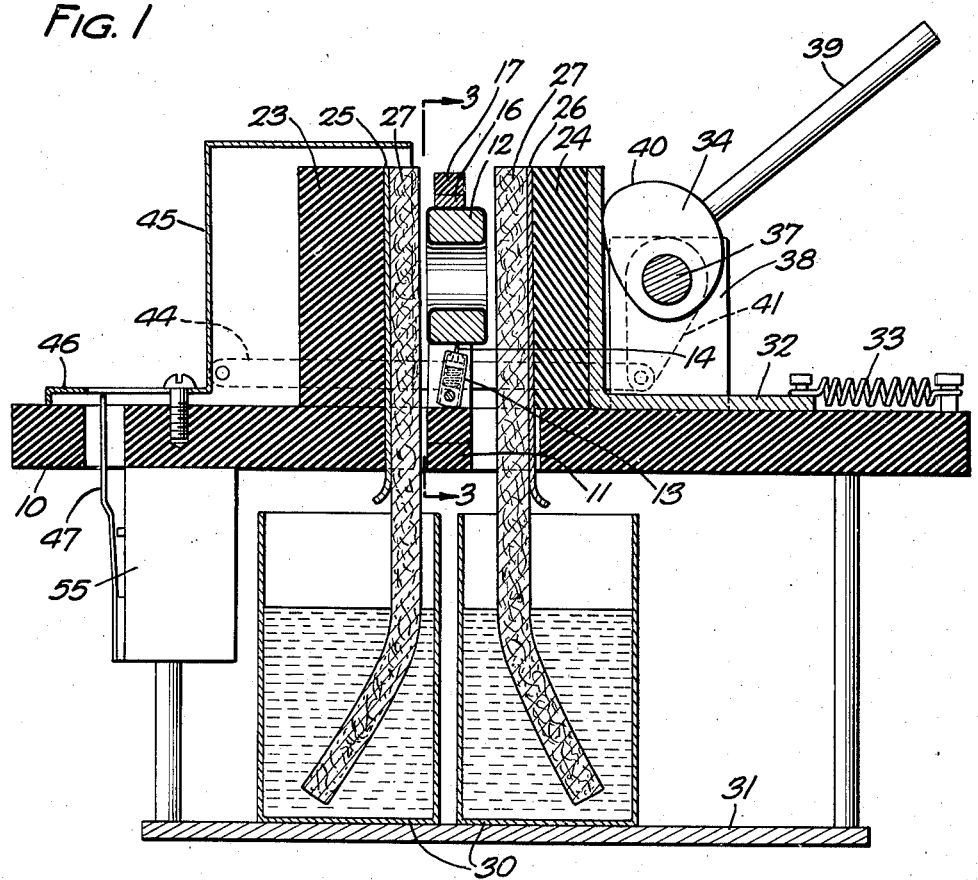
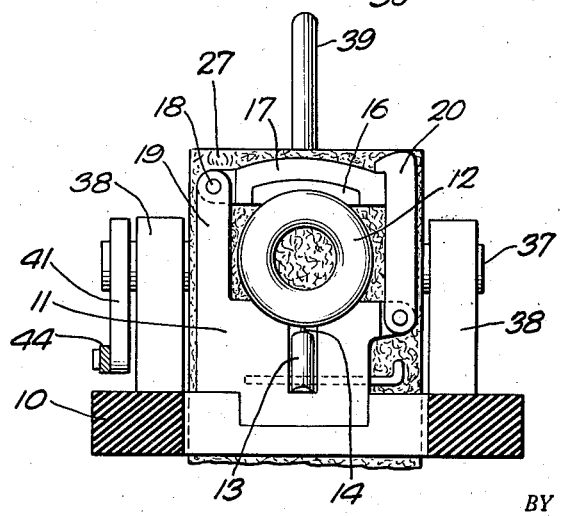
INVENTOR.
A. F. BANDUR
BY
ATTORNEY July 10, 1945.  A. F. BANDUR  2,379,947
TESTING DEVICE
Filed Sept. 9, 1942    2 Sheets-Sheet 2

INVENTOR.
A. F. BANDUR
BY
ATTORNEY

Patented July 10, 1945

2,379,947

UNITED STATES PATENT OFFICE 2,379,947

TESTING DEVICE

Adolph F. Bandur, Berwyn, Ill., assignor to Western Electric Company, Incorporated, New York, N. Y., a corporation of New York Application September 9, 1942, Serial No. 457,726

4 Claims. (Cl. 175—183)

This invention relates to testing devices and particularly to devices for use in detecting defects in the insulation of electrically insulated conducting structures.

An object of this invention is the provision of a simple and practical device for use in testing electrically insulated conducting structures to detect defects in the insulation thereof.

In accordance with one embodiment of the invention, as applied to the testing of enamel insulated electrical loading coil cores of the annular type to detect defects in the insulation thereof, there is provided a fixture comprising a core rest equipped with a spring loaded pin arranged to pierce the insulation of the core as means is actuated to clamp the core on the rest. Two electrodes having wet felt facing strips or pads on their inner opposed side faces are arranged adjacent opposite ends of the core. One of the electrodes is movable and upon the core being clamped between the electrodes, the wet felt strips serve as compressible electrodes which effectively engage the rounded edges of the inner and outer peripheries of the core as well as the flat end faces thereof. The electrodes are connected in parallel and in series with the spring loaded pin in an electrical circuit which includes a signal device and when the insulation on the core is not capable of withstanding a desired potential or is otherwise defective at either end thereof, a path for the current is provided through one or the other of the wet felt strips on the electrodes, the core, and the piercing pin, and the signal device will be actuated to indicate that the insulation on the core is defective.

In an alternative fixture, the insulation on the core is not pierced, but the electrodes are connected in series in the electrical signal circuit and in case the insulation is not capable of withstanding a desired potential or is otherwise defective at each end of the core, a path for the current is provided through the core and the wet felt electrode strips and an indication will be given that the insulation on the core is defective.

Other objects and advantages of this invention will be apparent from the following detailed description taken in conjunction with the accompanying drawings, in which Fig. 1 is a vertical sectional view of a testing fixture embodying the features of the invention for use in detecting defects in the insulation of loading coil cores, a core being shown supported and clamped on a rest between the electrodes ready for the test;

Fig. 3 is an enlarged fragmentary vertical section taken on the line 3—3 of Fig. 1 with the core clamped to the rest.

Figure 2:
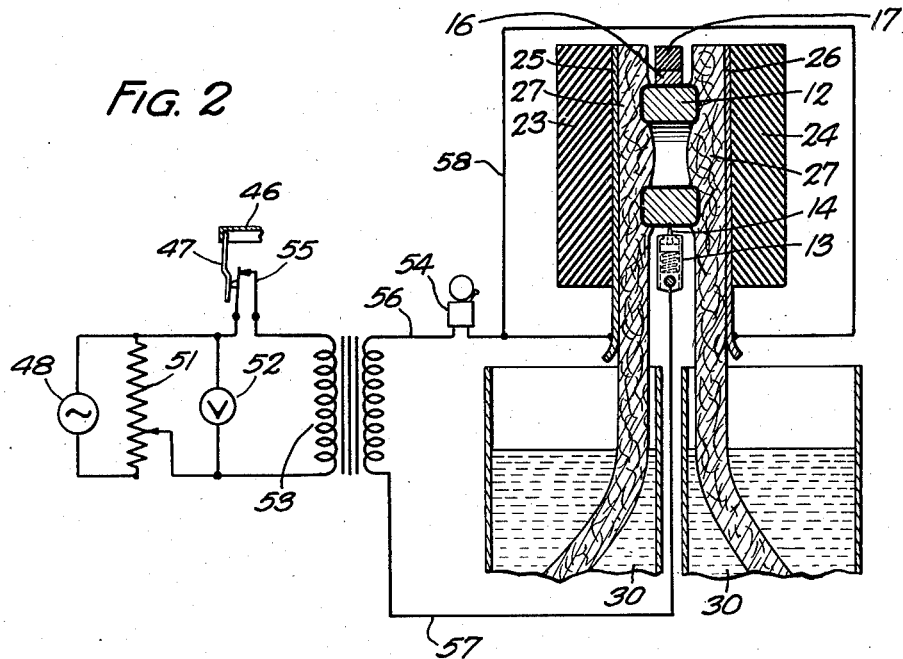
Fig. 2 is a diagrammatic view of portions of the fixture showing an electric signal circuit connected to the electrodes, the core being shown clamped to the rest and also clamped between the wet felt electrode strips.

Referring to the drawings in detail and particularly to Fig. 1, a main support 10 carries thereon a core rest 11 which is formed with an arcuate upper face (Fig. 3) for receiving and supporting an annular shaped core 12. Pivotally mounted in a slot in the core rest 11 is a housing 13 carrying a spring loaded pin 14, the pin being arranged in clamping the core 12 on the rest to pierce an enamel insulation on the core and to contact the metallic center thereof which, in the present core, is composed of compressed permalloy powder. The core 12 is clamped to the rest 11 by means of a pad 16 carried by a lever 17 pivoted at 18 to a post 19 integral with the core rest 11, the pad having an arcuate lower face for engaging the periphery of the core 12 (Fig. 3). The lever 17, upon being swung over the core 12, presses the pad 16 against the core, whereupon the spring loaded pin 14 pierces the insulation thereof. A latch 20 is provided for holding the lever 17 in its operative position. The pin 14 is connected to an electrical signal circuit (Fig. 2), which will be referred to hereinafter.

Arranged upon the support 10 at each side of the core rest 11 are blocks 23 and 24 of insulating material, to the inner opposed faces of which are attached electrodes 25 and 26, respectively. Secured to the inner opposed faces of the electrodes 25 and 26 are compressible felt strips or pads 27, which extend down into water containers 30 carried on a framework 31 attached to the lower face of the support 10, the felt strips being maintained constantly wet by capillary action. The block 23 is fixed to the support 10 and the block 24 is secured to an L-shaped plate or carrier 32, which is slidable on the upper face of the support 10 for movement to and from the block 23 so that opposite ends of the core 12 may be clamped between the wet felt strips 27 on the electrodes 25 and 26. A spring 33, having opposite ends attached to the carrier 32, and the support 10, normally acts to hold the carrier which carries the electrode 26 and its felt strip 27 in its retracted position, as shown in Fig. 1. For sliding the carrier 32 and thereby the electrode 26 and felt strip 27 toward the stationary electrode 25 and its felt strip 27 to clamp the core therebetween, a rotatable cam 34 is provided which is fixed to a shaft 37 journalled on spaced standards 38 fixed to the support 10. By swinging a handle 39 fixed to the cam 34 in a counter-clockwise direction (Fig. 1) a rise 40 on the cam bears against a vertical arm of the L-shaped carrier 32 and slides it to the left, as viewed in Fig. 1, thus clamping the core 12 between the wet felt strips 27 on the electrodes 25 and 26. It is to be understood that the spring loaded pin 14 in the housing 13, the lever 17 and the latch 20 are so mounted and arranged that they are free to move slightly in a lateral direction when the cam 34 is actuated to clamp the core 12 between the electrodes.

To the rear end of the shaft 37 (Fig. 1) is attached a crank arm 41, to the outer end of which is pivoted one end of a link 44. The opposite end of the link 44 is pivoted to a guard 45 slidably mounted on the upper face of the support 10. The guard 45 is so shaped and the movement thereof through the crank arm 41 and link 44 is such that when the core 12 is clamped between the wet felt strips 27 on the electrodes 25 and 26, the guard 45 covers the core, felt strip and electrodes. The guard 45 carries an arm 46 (Fig. 1) arranged to engage and move an arm 47 having one end extending upwardly through a slot in the support 10, the lower end of the arm 47 being operatively connected to a safety switch included in the electrical circuit (Fig. 2) to be described hereinafter. In timed relation with the movement of the guard 45 into and out of operative position over the core 12 and electrodes 25 and 26, the safety switch is closed and opened.

The above-described fixture is used with an electrical test set and signal circuit shown diagrammatically in Fig. 2, which comprises a source of electrical energy 49, a rheostat 51, a voltmeter 52, a transformer 53, a signal device in the form of a bell ringer 54 and a safety switch 55, all suitably connected in the circuit and including conductors 56 and 57 connecting opposite sides of the circuit to the electrode 25 and spring loaded insulation piercing pin 14, respectively, and a conductor 58 which connects the electrodes 25 and 26 in parallel.

In using the fixture and its associated circuit, the rheostat is adjusted to provide the desired potential between the electrodes 25 and 26 carrying the wet felt strips 27, which are connected in parallel and in series with the pin 14. The particular adjustment of the rheostat, it is to be understood, will depend on the type and thickness of the insulation on the core 12, which is to be subjected to the test.

The core 12 is then placed on the rest 11 and clamped thereto by means of the pad 16 on the pivoted lever 17 and secured by the latch 20, in the manner previously described. In this core clamping operation, the spring loaded pin 14 pierces the insulation of the core and contacts the compressed permalloy center thereof. Thereafter, the slidable electrode 26 and its wet felt strip 27 is moved towards its companion electrode 25 and wet felt strip 27 by rotating the cam 34 in a counter-clockwise direction by means of the attached handle 39, the operator holding the handle in its operative position until the test is completed. In timed relation with the clamping of the core 12 between the wet felt electrode strip 27, the guard 45 is moved into position thereover and the safety switch 55 is closed, all in the manner previously described.

As clearly shown in Figs. 2 and 3, the compressible wet felt electrode strips 27, when the core 12 is clamped therebetween, engage and shape themselves to the rounded inner and outer continuous peripheral edges of the core, as well as against the flat annular end faces thereof. Thus, the greater portion of the insulated surface area of the core 12 and particularly the rounded peripheral edge surface thereof, which may have defective insulation due to the enamel insulation being too thin around these edges or of breaks therein, are effectively engaged. In case the core insulation, which is engaged by the wet felt electrode strips, is broken or its thickness is such that it affords a conducting path through the permalloy center of the core, the circuit is completed and the bell ringer 54 will be actuated to indicate the same. The defect in the insulation may be at only one end of the core or at both ends and, in either case, the ringer will indicate the defect. When the circuit is not completed with the core 12 clamped between the wet felt electrode strips 27, the insulation on the core engaged by the electrode strips is considered acceptable. To complete the insulation test on the inner and outer peripheral surfaces of the core 12 not engaged by the wet felt electrode strips 27, they are checked visually and also by means of a manually moved searching pin passed over these surfaces, the pin being connected to an electrical signal circuit.

Figure 4:
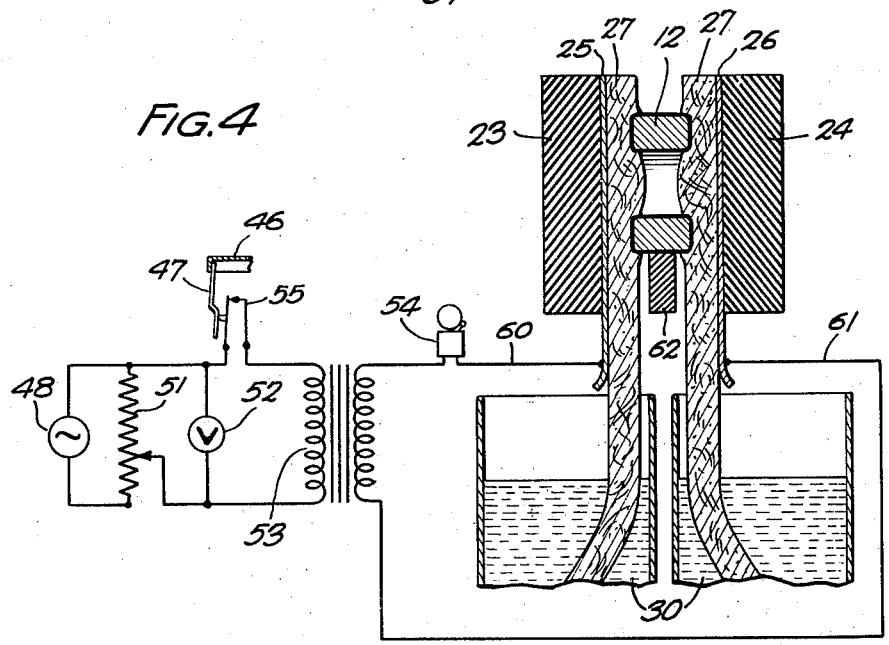
Fig. 4 is a view similar to Fig. 2 showing an alternative testing fixture and signal circuit for use in detecting insulation defects in electrically insulated loading coil cores.

In the alternative embodiment of this invention, shown in Fig. 4, the electrodes 25 and 26 are connected in series by conductors 60 and 61 to an electrical signal circuit similar to that used in the hereinbefore described embodiment (Fig. 2), wherein, that is, in the latter embodiment, the insulation piercing pin 14 is connected in series with the electrodes 25 and 26, the latter being connected in parallel. In the arrangement of Fig. 4, the core 12 is merely placed on a rest 62 and clamped between the wet felt electrode strips 27 in the manner previously described (Fig. 2). In case the insulation on the core 12 at each end thereof is either too thin, broken, or otherwise defective or a combination of such defects, a conducting path will be provided across the wet felt electrode strips 27, through the insulation at the defective points in the insulation, at each end of the core and through the conducting center thereof, and the bell ringer 54 will be actuated to indicate the same.

It will be understood that the embodiments herein described are merely illustrative of the invention and one application thereof and that modifications can be made and it is capable of other applications.

What is claimed is:

1. In a device for detecting defective insulation of electrically insulated conducting structures, a support for an insulated conducting structure, means for piercing the insulation of said structure, relatively movable electrodes having wet compressible liquid absorbent members for engaging surfaces of the structure, means for relatively moving said electrodes to clamp the structure therebetween, and an electric signal circuit connected to said insulation piercing means and to said electrodes adapted to be operated when a current path is provided through said structure due to defective insulation.

2. In a device for detecting defective insulation of electrically insulated conducting structures, a support for an insulated conducting structure, means for securing the structure to said support, means effective simultaneously with the securing of the structure for piercing the insulation thereof, relatively movable electrodes having wet compressible liquid absorbent members for engaging surfaces of the structure, means for relatively moving said electrodes to clamp the structure therebetween, and an electric signal circuit connected to said insulation piercing means and to said electrodes adapted to be operated when a current path is provided through said structure due to defective insulation.

3. In a device for detecting defective insulation of electrically insulated conducting structures, a support for an insulated conducting structure, means for clamping the structure to said support, yieldable means effective simultaneously with the clamping of the structure for piercing the insulation thereof, electrodes having wet compressible liquid absorbent members for engaging surfaces of the structure, means for supplying a conducting fluid to said members, one of said electrodes being mounted for movement toward said other electrode, means for actuating said movable electrode to clamp the structure between said electrodes, and an electric signal circuit connected to said insulation piercing means and to said electrodes adapted to be operated when a current path is provided through said structure due to defective insulation.

4. In a device for detecting defective insulation of electrically insulated conducting structures, a support for an insulated conducting structure, means for clamping the structure to said support, a spring loaded insulation piercing pin in said support, means for clamping the structure to said support to cause said pin to pierce the insulation of the structure, electrodes having wet felt strips secured thereto for engaging opposite surfaces of the structure, a container for conducting fluid into which depending ends of said felt strips extend for maintaining the strips wet by capillary action, one of said electrodes being mounted for movement toward said other electrode, means for actuating said movable electrode to clamp the structure between said electrodes, and an electric signal circuit connected to said insulation, piercing pin, and to said electrodes adapted to be operated when a current path is provided through said structure due to defective insulation.

ADOLPH F. BANDUR.